Jan. 23, 1968 R. R. ERNST 3,364,677
AUTOMOTIVE AIR INJECTION SYSTEM
Filed March 15, 1966
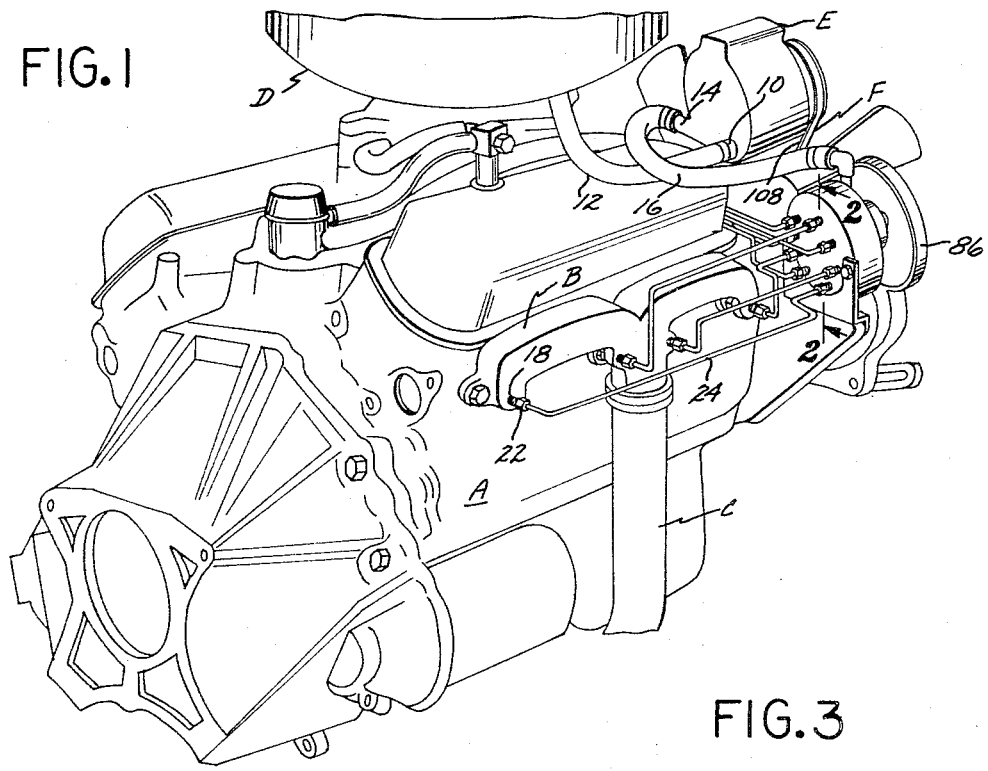
FIG.1
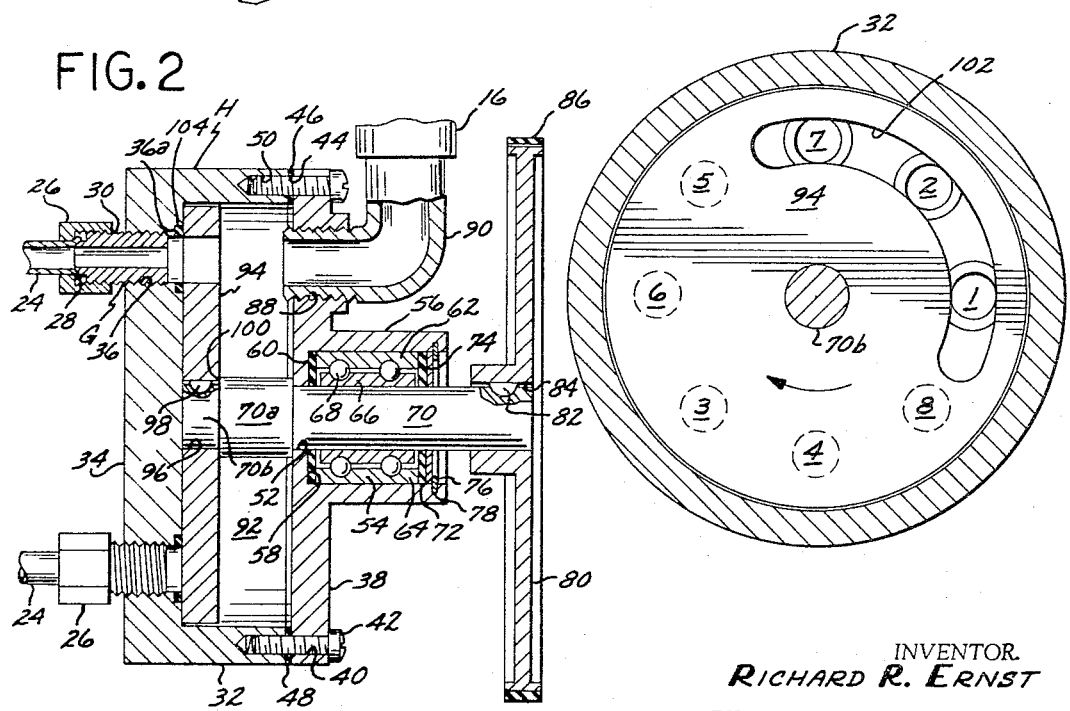
FIG.2
FIG.3
INVENTOR.
RICHARD R. ERNST
BY William C. Babcock
ATTORNEY

United States Patent Office 3,364,677
Patented Jan. 23, 1968

3,364,677
AUTOMOTIVE AIR INJECTION SYSTEM
Richard R. Ernst, Hawthorne, Calif.
(2423 Burritt Ave., Redondo Beach, Calif. 90278)
Filed Mar. 15, 1966, Ser. No. 534,350
8 Claims. (Cl. 60—30)

The present invention relates generally to the field of automotive accessories, and more particularly to an improved air injection system that intermittently delivers air to positions adjacent the exhaust valves during the time they are in the open position to minimize the discharge of unburned hydrocarbons and carbon monoxide from the exhaust manifold during operation of the engine.

In recent years, many states have required that automotive engines be equipped with exhaust control devices to minimize the discharge of carbon monoxide and unburned hydrocarbons into the atmosphere. One device that is widely used for this purpose is a pump that continuously delivers a large volume of low pressure air into the exhaust manifold at positions adjacent the exhaust valve. The oxygen in the air so delivered prolongs the burning of the hydrocarbons discharged into the exhaust manifold and converts the same to harmless carbon dioxide and water vapor. Also, the excess oxygen in the air so delivered tends to transform the carbon monoxide discharged into the exhaust manifold to carbon dioxide.

Although this device provides the operational advantage that the percentage of unburned hydrocarbons and carbon monoxide that would normally be discharged to the atmosphere, is reduced by being converted to carbon dioxide, and water vapor, the device has the operational disadvantage that it continuously cools the external surfaces of the heads of the exhaust valves. The heads of the exhaust valves due to the injection of cool air by the above mentioned device, are subjected to a high differential in temperature, and as a result tend to warp. The heads of the exhaust valves, due to this warping, fail to seat properly, and as a result the efficiency of the engine is substantially reduced.

A major object of the present invention is to provide an improved air injection system for use on automotive engines, or other internal combustion engines that operate in an environment where it is undesirable to discharge unburned hydrocarbons and carbon monoxide to the ambient atmosphere.

Another object of the invention is to provide an air injection system that intermittently supplies excess air to positions adjacent the exhaust valves, but only during the time that the valves are in the open position, with the result that the differential in temperature between the external and internal surfaces of the valve heads is minimized, and the valve heads do not tend to warp and fail to seat properly with a resultant decrease in efficiency of the engine with which they are associated.

Another object of the invention is to supply an improved air injection system that has a relatively simple mechanical structure, is simple and easy to install on an internal combustion engine, can be fabricated from standard, commercially available materials, requires a minimum of maintenance attention, and can be sold at a sufficiently low price as to encourage its widespread use for i s intended purposes.

These and other objects and advantages of the invention will become apparent from the following description of a preferred form thereof and from the drawing illustrating the same, in which:

FIGURE 1 is a perspective view of an eight cylinder automotive engine with the device mounted thereon;

FIGURE 2 is a vertical cross-sectional view of a portion of the device taken on the line 2—2 of FIGURE 1; and FIGURE 3 is a transverse cross-sectional view of the device taken on the line 3—3 of FIGURE 2.

Referring now to the drawing for the general arrangement of the invention, it is illustrated in FIGURE 1 as mounted on a conventional V-8 internal combustion engine A having two identical discharge manifolds B on opposite sides thereof, which manifolds are connected by pipe C that leads to the muffler (not shown). The engine A is provided with a conventional air filter D. An air pump E of conventional design is mounted on the upper forward portion of the engine A and is driven by a belt F that extends to a power take-off (not shown) on the engine A. The pump E is of the positive displacement type and one that is commercially available and is manufactured by the Saginaw Division of General Motors. This pump E is used by General Motors on all of their 1966 cars that require an air injection system. The pump E is manufactured in two types, one with two air discharge outlets that is used on V-8 type engines, and a second type that has a single outlet for use on six cylinder engines. The pump E illustrated in FIGURE 1 is of the second type, but in combination with applicant's invention may be used on a V-8 type engine, for reasons that will later become apparent.

The pump E has an air intake 10 that is connected by a tube 12 to a conventional air filter D. Thus, air entering the pump E through the air intake 10 is clean, as it has been previously drawn through the filter D. The pump E has an air discharge 14 through which clean air under pressure is discharged to a tube 16. Each of the manifolds B, as can best be seen in FIGURE 1, has a number of tapped bores 18 formed therein that are adjacently disposed to the exhaust valves (not shown) of the engine. Each of the tapped bores 18 receives a suitable threaded tubing fitting 22 that is connected to a length of tubing 24 that extends forwardly to a second fitting G of a conventional type. The fitting G includes a nut 26, as can best be seen in FIGURE 2, that is of such structure as to engage a flared forward end 28 of tubing 24 and force the same into sealing contact with the rearward tapered end of an externally threaded plug 30.

The detailed structure of the air distribution device H that forms a part of the invention, is shown in detail in FIGURES 2 and 3. The device H preferably includes a metallic cast housing that is defined by a continuous sidewall 32 which on the rearward end thereof, as can be seen in FIGURE 2, merges into a first end piece 34 in which a number of circumferentially spaced partially tapped ports 36 are formed that are engaged by the threaded plugs 30.

A second end piece 38 is provided that has a number of circumferentially spaced bores 40 formed therein, through which a number of screws 42 extend. The screws 42 extend through openings 44 formed in a circular resilient washer 46 that is disposed between the outer rearward surface of the second end piece 38 and the forward face 48 of the side wall 32. Screws 42 project into a number of circumferentially spaced tapped bores 50 that extend rearwardly in the side wall 32 from the forward face 48 thereof. The second end piece 38 is formed with a centrally disposed bore 52 that is in communication with a cylindrical confined space 54 situated in a boss 56 that projects forwardly from the second end piece 38. The confined space 54 is of substantially greater diameter than the bore 52. The boss 56 and the bore 52 at their junction define a circular body shoulder 58 against which a resilient washer 60 seats.

A ball bearing assembly 62 is disposed in confined space 54, with an outer race 64 of the assembly having the rearward end thereof in abutting contact with the forward outer surface of the washer 60. An inner race 66 of the assembly 62 is rotatably supported relative to the outer race 64 by a number of ball bearings 68. The inner race 66 rotatably supports a shaft 70 that extends forwardly beyond the boss 56, as well as rearwardly therefrom. A second resilient washer 72 is disposed in confined space 54 and is held in abutting sealing contact with the forward surface of the outer race 64 by a thin ring-shaped plate 74. The plate 74 is held in pressure contact with the second resilient washer 72 by a snap ring 76 that engages a circumferentially extending groove 78 formed in the forward interior portion of the boss 56.

A sprocket 80 is mounted on the forward end of the shaft 70 and is held in a non-rotatable position relative thereto by a key 82, as may be seen in FIGURE 2. The key 82 engages longitudinally extending aligned grooves 84 formed in the sprocket 80 and in the shaft 70. The sprocket 80 is driven by an endless belt 86 that engages a sprocket (not shown) that is rotated by the crankshaft (not shown) of the engine A, as is conventional in such engines, as well as engaging the timing sprocket (not shown) that rotates the camshaft (not shown) of the engine.

The second end piece 38 has a tapped bore 88 formed therein that is threadedly engaged by a tubular L 90 that is connected to the tubing 16. The interior of the sidewall 32 and the adjacently disposed surfaces of the end pieces 34 and 38 cooperate to define a confined space 92, as may be seen in FIGURE 1, into which air is discharged under pressure through the L 90 as the pump E operates. An apertured air distribution plate 94 is disposed in the confined space 92 and adjacently situated to the forward face of the first end piece 34. The shaft 70, as can best be seen in FIGURE 2, has an enlarged portion 70a situated inside the confined space 92. The plate 94 has a centrally disposed bore 96 therein, that slidably engages the rearward extremity 70b of shaft 70 and is secured thereto in a conventional manner by a key 98.

The rearward face of the air distribution plate 94 is in slidable contact with the forward face of the first end piece 34. The plate 94 is prevented from moving forward on the shaft 70 due to contact with a circumferentially extending body shoulder 100, that is defined at the junction of the shaft portions 70a and 70b. Plate 94 has an arcuate-shaped slot 102 formed therein, as can best be seen in FIGURE 3. The ports 36 at the forward ends thereof are in communication with recesses 36a formed in the first end piece 34. The recesses 36a support resilient circular sealing members 104 that are at all times in slidable pressure sealing contact with the rearward surface of the plate 94, to prevent air under pressure flowing from the confined space 92 around the plate 94 into the ports 36.

In a conventional engine A of the eight cylinder type such as shown in FIGURE 1, each piston moves through a four-stroke cycle, which includes intake, compression, power and exhaust. Two complete revolutions of the crankshaft (not shown) are necessary for each cycle to be completed once. Each cylinder passes through this four-stage cycle, but the cycles are staged so that each cylinder is fired in an order which develops a smooth flow of power. Thus, four cylinders of the engine fire on each revolution of the crankshaft, and, of course, for all eight cylinders to fire, two revolutions of the crankshaft are required.

As each piston in the engine approaches the bottom of the power stroke, the exhaust valve associated therewith opens and, because of the combustion pressure within the cylinder, a portion of the products of combustion which are under pressure flow into one of the exhaust manifolds B. The piston returns to the top of its stroke, forcing the remaining gaseous products of combustion through the open exhaust valve. The air distribution plate 94 rotates one revolution for each two revolutions of the crankshaft, due to the diameter of the sprocket 80 relative to the diameter of the sprocket (not shown) that drives the belt 86. The firing pattern of the cylinders in internal combustion engines varies, but in the engine A shown in FIGURE 1, it will be assumed that the cylinders fire in the following sequence: 1–8–4–3–6–5–7–2, and the ports 36 have been so identified in FIGURE 3. Thus, it will be seen that in the operation of the engine A, the eight exhaust valves of the engine each open once on each two revolutions of the crankshaft (not shown) associated therewith, or four exhaust valves open on each revolution of the crankshaft. Each of the four exhaust valves that open on one revolution of the crankshaft (not shown) of the engine A, open as one of the pistons moves towards the bottom of its power stroke. The slot 102 extends for approximately 150° on the plate 94 and is radially aligned with ports 36 so that air under pressure from confined space 92 is sequentially delivered through the tubes 24 to the exhaust valves as they open to blend with the products of combustion as the same are discharged into the discharge manifolds B. This discharge of air in the form of spaced pulses occurs each time an exhaust valve (not shown) initially opens, as well as during the time that each of the pistons associated with an open exhaust valve moves upwardly on the exhaust stroke. In the position of the air distribution plate 94 as shown in FIGURE 3, the exhaust valve associated with the number 1 cylinder has just opened, and air from confined space 92 is being discharged through one of the ports 36 and tubes 24 to a position adjacent thereto, as well as to positions adjacent the exhaust valves numbers 2 and 7. The diameter of the sprocket 80 is so related relative to the driving sprocket (not shown) rotated by the crankshaft, that the air distribution plate 94 rotates but one-half revolution for each revolution of the crankshaft. In the position of the plate shown in FIGURE 3, air is being discharged to positions adjacent the numbers 1, 2 and 7 exhaust valves and as the plate rotates in a clockwise direction, air in the near future as the plate rotates, will be exhausted through the number 8 port to discharge to a position adjacent the exhaust valve associated with the number 8 cylinder. Due to the intermittent discharge of air under pressure to positions adjacent the exhaust valves (not shown) as they open, the discharging air mixes with the hot products of combustion as they exhaust to the manifolds B, and the oxygen in the discharging air serves to convert the hydrocarbons in the exhaust to non-injurious products. This operation is carried out without the exhaust valves being subjected to such a differential in temperature that they would warp and fail to seat properly with a resulting decrease in efficiency in the operation of the engine.

Although the air distribution device has been described as a separate unit, it will be apparent that it could be combined with the air pump E if desired.

The use and operation of the present invention has been previously described in detail, and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. The combination with an internal combustion engine having a drive shaft, exhaust valves, a driven timing sprocket, at least one manifold for receiving the exhaust from said valves, and means for driving said pump as said crankshaft rotates, of an air distribution device for furthering the oxidation of products of combustion as they are discharged into said manifold as said exhaust, said device including:

(a) a hollow housing that defines a confined space therein, said housing including a first flat end piece in which a plurality of circumferentially spaced ports are formed;

(b) a plurality of tubing fittings sealingly disposed in bores in said manifold, with each of said fittings adjacent one of said exhaust valves;

(c) a plurality of tubes connected to said fittings and to said ports;

(d) a rotatable plate disposed in said confined space adjacent said first end piece, which plate has an opening therein that is sequentially aligned with said ports as said plate rotates;

(e) a shaft affixed to said plate and rotatably and sealingly supported in said housing;

(f) first means for delivering air under pressure from said pump to said confined space; and (g) second means for transferring power from said timing sprocket to said shaft and plate to concurrently rotate the same, with the rate of rotation of said shaft and plate being such that air under pressure flows from said confined space through said ports and tubes to positions adjacent said exhaust valves to mix with and further oxidize said exhaust only when said exhaust valves are in open positions.

2. An air distribution device as defined in claim 1, which in addition includes:

(h) third resilient means adjacent said ports that slidably and sealingly contact said plate for preventing the flow of air from said confined space to said ports without passing through said opening.

3. An air distribution device as defined in claim 2 in which said third resilient means are a plurality of resilient washers supported in recesses on the interior surface of said first end piece, which recesses are coaxially aligned with said ports.

4. An air distribution device as defined in claim 1 in which said housing further includes:

(h) a side wall integrally formed with said first end piece;

(i) a second end piece that abuts against the portion of said side wall most remote from said first end piece; and (j) third means for removably holding said second end piece on said side wall.

5. An air distribution system as defined in claim 4 which in addition includes:

(k) a cylindrical base that extends outwardly from the central portion of said second end piece away from said first end piece;

(l) a ball bearing assembly disposed in said boss that rotatably supports said shaft; and (m) sealing means in said boss for preventing the discharge of air under pressure from said confined space to the ambient atmosphere.

6. An air distribution device as defined in claim 4 in which said first means is:

(k) a tubing fitting in communication with an opening in said second end piece that extends therethrough to said confined space; and (l) a tube connected to said fitting and to the discharge of said pump.

7. An air distribution device as defined in claim 1 in which said second means is:

(h) a sprocket mounted on the end portion of said shaft most remote from said plate; and (i) an endless belt that drivingly engages said sprocket and said timing sprocket.

8. An air distribution device as defined in claim 1 in which said opening is in the form of an arcuate slot.

References Cited

UNITED STATES PATENTS 3,141,448  7/1964  Candelise _____ 123—26
3,285,002  11/1966  Hines _____ 60—30

RALPH D. BLAKESLEE, *Primary Examiner.*